Feb. 6, 1962     J. C. M. FROST ET AL     3,020,003
DISC AIRCRAFT WITH GAS TURBINE AND RAM JET ENGINES
Filed July 2, 1956     11 Sheets-Sheet 1

INVENTORS
J. C. M. FROST
C. J. WILLIAMS
BY
*Maybee & Legris*
ATTORNEYS

Feb. 6, 1962         J. C. M. FROST ET AL         3,020,003
              DISC AIRCRAFT WITH GAS TURBINE AND RAM JET ENGINES
Filed July 2, 1956                              11 Sheets-Sheet 3

INVENTORS
J. C. M. FROST
C. J. WILLIAMS
BY
Maybee & Legris
ATTORNEYS

Feb. 6, 1962 J. C. M. FROST ET AL 3,020,003
DISC AIRCRAFT WITH GAS TURBINE AND RAM JET ENGINES
Filed July 2, 1956 11 Sheets-Sheet 6

INVENTORS
J. C. M. FROST
C. J. WILLIAMS
BY
*Maybee & Legris*
ATTORNEYS

Feb. 6, 1962     J. C. M. FROST ET AL     3,020,003
DISC AIRCRAFT WITH GAS TURBINE AND RAM JET ENGINES
Filed July 2, 1956     11 Sheets-Sheet 9

INVENTORS
J.C.M. FROST
C.J. WILLIAMS
BY
Maybee & Legris
ATTORNEYS

FIG.12.

United States Patent Office 3,020,003
Patented Feb. 6, 1962

3,020,003
DISC AIRCRAFT WITH GAS TURBINE AND RAM JET ENGINES
John Carver Meadows Frost, Georgetown, Ontario, and Claude John Williams, Toronto, Ontario, Canada, assignors to Avro Aircraft Limited, Malton, Ontario, Canada, a corporation of Canada
Filed July 2, 1956, Ser. No. 595,547
Claims priority, application Great Britain July 5, 1955
14 Claims. (Cl. 244—15)

This invention relates to aircraft and more particularly to disc-type or circular aircraft deriving a propulsive thrust from a stream of high speed gases flowing within the aircraft in generally radial directions and discharged from the periphery thereof.

Co-pending patent application Serial No. 507,100, dated May 9, 1955, and filed by John Carver Meadows Frost and Thomas Desmond Earl, discloses a circular aircraft having multiple radially disposed gas turbine engines. Opposed aerofoil surfaces, which cover the engines, converge towards each other in an outboard direction from their central inboard portions to their perimetrical edges to provide a structure which can be described as being generally lentiform. Air enters inlets provided in the aerofoil surfaces, then, after passing through a central circular plenum chamber, flows radially outboardly through a plurality of radially disposed axial flow gas turbine engines. The engines are so arranged that their axes of rotation are equi-angularly spaced from each other; the products of combustion are discharged into an annularly arranged exhaust passage from which they are discharged to atmosphere through a bifurcated nozzle. By suitable control means which actuate shutters, the gases can be caused to flow so that the aircraft will take off vertically and also will fly under complete control in horizontal flight.

Present day axial flow gas turbine engines have been developed to a high degree of thermal efficiency. However, it can be shown that, under certain conditions, the efficiency of the ram-jet engine surpasses that of the gas turbine engine. The high efficiency of the ram-jet engine is attainable only after the intake velocity exceeds a minimum critical velocity; consequently the ram-jet engine heretofore has been very inefficient at low aircraft speed. Ram-jet engines therefore have been used in aircraft installations only in combination with gas turbine engines or rocket engines whereby the aircraft can first reach a first predetermined minimum speed, or as a means of propulsion for rotating the blades of helicopters where, by disposing the engines at the blade tips, fairly high intake velocity may be attained even while the aircraft remains stationary.

It is the main object of the invention, therefore, to provide an aircraft which can effectively utilize the ram-jet engine even at low or varying forward speeds.

It is another object of the invention to provide a disc-type aircraft with a much more efficient arrangement than has been visualized previously.

It is a further object of the invention to provide a disc-type aircraft having greatly reduced structure and engine weights.

The foregoing and other objects and advantages of the invention will become apparent from a study of the following specification, taken in conjunction with the accompanying drawings, in which like reference characters indicate corresponding parts throughout the several views, and in which.

Referring to FIGS. 1–7, an aircraft constructed in accordance with the invention includes a large number (seventy-two, to be exact) of radially arranged main ribs 10 secured at their inboard ends to a flanged central ring 11. Each twelfth main rib 10 is a dual rib as indicated at 10a, and the outboard segments 10b of the main ribs 10 are constituted by two flanged plates disposed back-to-back. Interposed between adjacent main ribs 10 are short ribs 12, the outboard ends of which terminate on the same circle as the inboard ends of the rib segments 10b. The spaces between adjacent ribs provide ducts 13 which are interconnected by series of holes 14.

Figure 1:
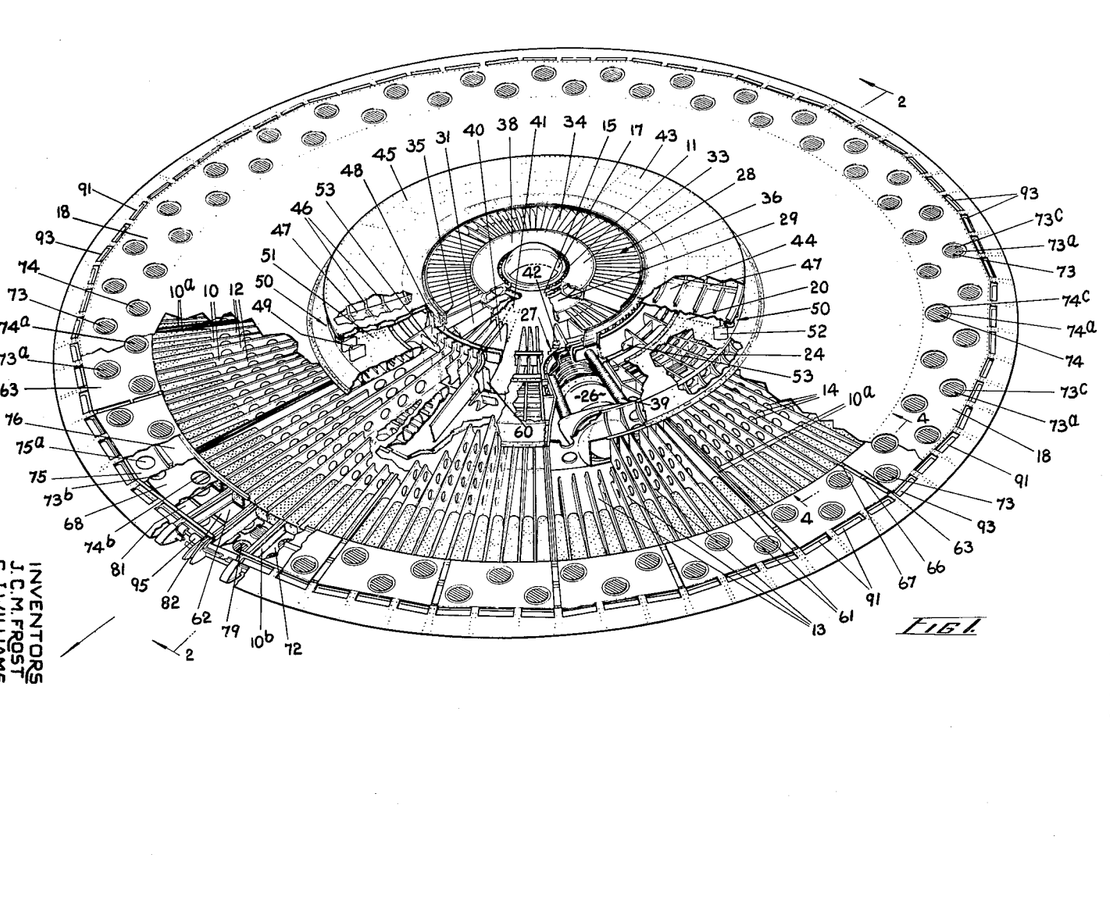
FIG. 1 is a broken away perspective view of a first embodiment of an aircraft constructed in accordance with the invention.
Figure 2:
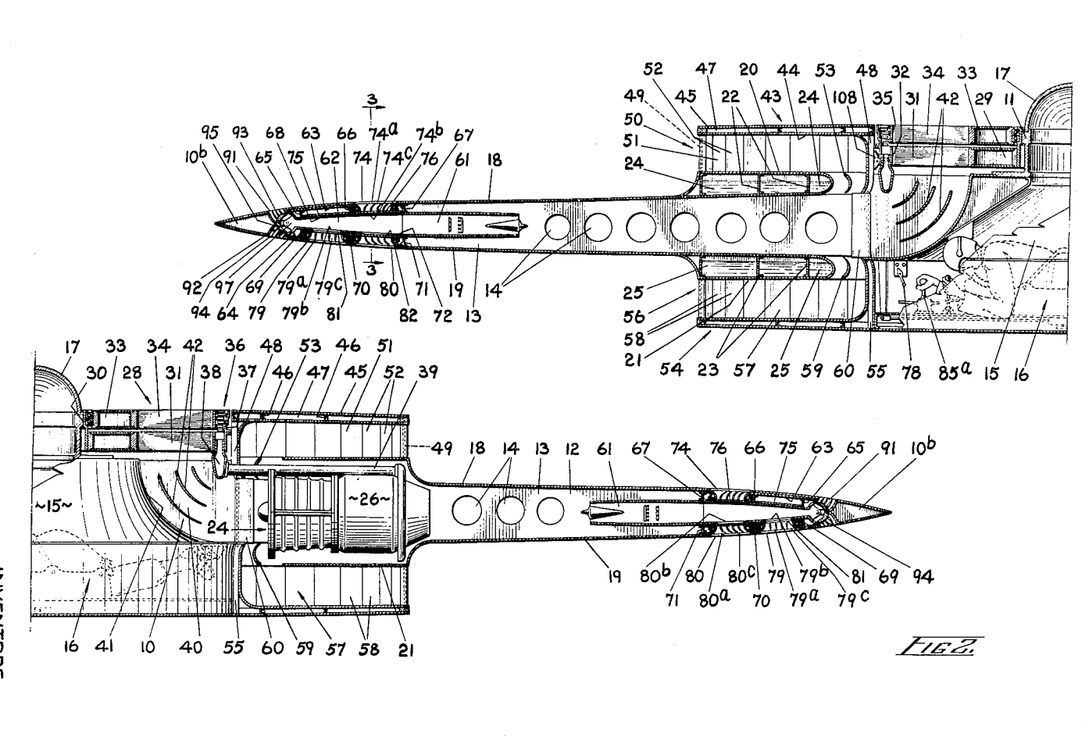
FIG. 2 is a diametrical cross-sectional view of the aircraft of FIG. 1, taken along the line 2—2 of FIG. 1.

The inboard ends of the main ribs 10 abut a truncated conical housing 15 which together with the space defined by the ring 11 provides part of a pilot's compartment generally indicated at 16. The pilot's compartment is covered by a hemispherical sealable closure 17, and in the compartment are located instruments and flying controls.

The outer edges of the ribs are sheathed by upper and lower skins or aerofoils 18 and 19; the inboard portions of these aerofoils together with plates 20 and 21 and circumferentially arranged spacers 22 and 23 provide substantially annular fuel compartments 24 and 25. The annular continuity of the fuel compartments is broken only by the spaces required to accommodate three equiangularly spaced radially disposed axial flow gas turbine engines 26 having inboardly facing inlets 27. Of necessity, the gas turbine engines take parts of the spaces which otherwise would be occupied by some of the ribs 10.

Suitably mounted on the ring 11 for limited universal movement is an axial flow air compressor generally indicated at 28. The compressor includes an annular stator housing 29 on the inboard periphery of which is provided a segmental spherical bearing 30 which is in engagement with a complementary bearing surface of the ring 11; the centre of these registering bearings approximately coincides with the centre of the aircraft, and thus the housing 29 and the parts that are supported thereby can pivot to a limited extent about the said centre, for a purpose which will be described subsequently. Extending outboardly from the housing 29 and secured thereto are the stator blades 31 of the compressor, which are encompassed by a shroud 32. Mounted for rotation relative to the stator housing 29 is a similar rotor housing 33 which supports at its outboard periphery an impeller 34 encompassed by a shroud 35. The compressor 28 is powered by a multistage axial flow turbine generally indicated at 36. The turbine includes a stator ring 37 secured in spaced relationship to the shroud 32 and extending around the impeller shroud 35 in spaced relationship thereto; the turbine stator blades extend inboardly from the ring 37 whilst the turbine rotor blades extend outboardly from the impeller shroud 35. A circumferential trough-like nozzle 38 which is positioned in recesses provided in the upper edges of the ribs 10 is in registration with the annular space between the shroud 32 and the stator ring 37.

The three axial flow gas turbine engines 26 have outlets which face outboardly to direct a portion of the products of combustion into the ducts 13 provided by the radial ribs. However, an appreciable proportion of the products of combustion of these three engines is bled from their combustion systems and is conveyed by ducts 39 to the nozzle 38. Thus, the turbine 36 is driven by the combustion systems of the gas turbine engines 26 and in turn it drives the impeller 34 of the compressor 28; in other words, the gas turbine engines provide an engine to drive the compressor. Air supplied by the compressor 28 initially flows inwardly in duct 40 and is deflected by a circumferential curved wall 41 and by cascades of vanes 42 to flow outboardly through the radial ducts 13 defined by the ribs 10 and 12; a fraction of the air enters the inlets 27 of the three gas turbine engines 26 to support combustion of the fuel therein.

A double-walled annular disc generally indicated at 43 is constituted by inner and outer skins 44 and 45 respectively, which are spaced by circumferential ribs 46 and by radial ribs 47. The disc 43 is supported at its inboard periphery by struts 48 which extend outwardly from the ribs 10, and at its outboard periphery by hinge pins 49 which extend outwardly from the plate 20 of the fuel compartment 24. The disc 43 is spaced from the plate 20 to define a circumferential air inlet 50 and to provide a plenum chamber 51. Freely movable vanes 52 are mounted in the air inlet 50 on hinges provided by the pins 49. The vanes are so constructed and arranged that they open automatically whenever the force of the air which strikes them exceeds the local pressure within the plenum chamber 51; if the force applied to a group of vanes is less than the pressure in the plenum chamber 51 the particular vanes will close thus blocking that portion of the inlet 50. A fixed circumferential vane 53 deflects inwardly the air entering the inlet 50 and flowing through the plenum chamber 51, the said air then flowing outboardly through the radial ducts 13.

At the lower central portion of the aircraft is a double-walled disc 54 which is similar to the disc 43 except that its central portion is closed. It is supported at its outboard periphery by hinge pins which extend outwardly from the plate 21 of the fuel compartment 25; it also is supported by struts 55 which extend outwardly from the ribs 10. The disc 54 is spaced from the plate 21 to define a circumferential inlet 56 and a plenum chamber 57. Around the inlet 56 is a series of hinged vanes 58 similar in construction and in operation to the vanes 52, and within the plenum chamber 57 is a fixed circumferential vane 59 which deflects inwardly the air entering the inlet 56 and flowing through the plenum chamber 57, the said air then flowing outboardly through the radial ducts 13.

In order to prevent air which enters the inlets 50 and 56 from flowing back into the compressor 28, there is provided a series of circumferentially arranged doors 60 which are so constructed that they close if the air pressure in the plenum chambers 51 and 57 exceeds the pressure of the air supplied by the compressor, and open automatically if the conditions are reversed. Thus, if the compressor 28 is in operation and the aircraft is not moving forward so that no air is being rammed into the inlets 50 and 56, the doors 60 will remain open. On the other hand, if the aircraft is flying at a forward velocity such that the pressure caused by the air being rammed into the inlets 50 and 56 exceeds the pressure of the air compressed by the compressor 28, the doors 60 automatically will close.

Within each duct 13 and adjacent its outboard end is a flame tube 61 which discharges its products of combustion to atmosphere through an annular outlet constituted by a series of shuttered nozzles. Each duct 13 and the flame tube 61 within the duct constitutes a ram jet engine.

Figure 3:
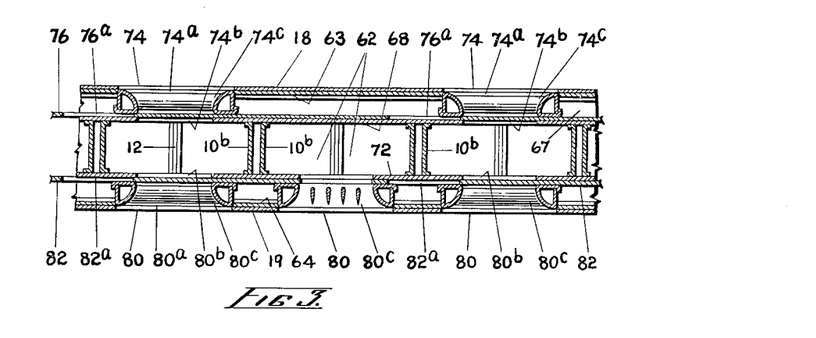
FIG. 3 is a fragmentary cross-sectional view taken along the line 3—3 of FIG. 2 and showing particularly the construction of typical thrust outlets.
Figure 7:
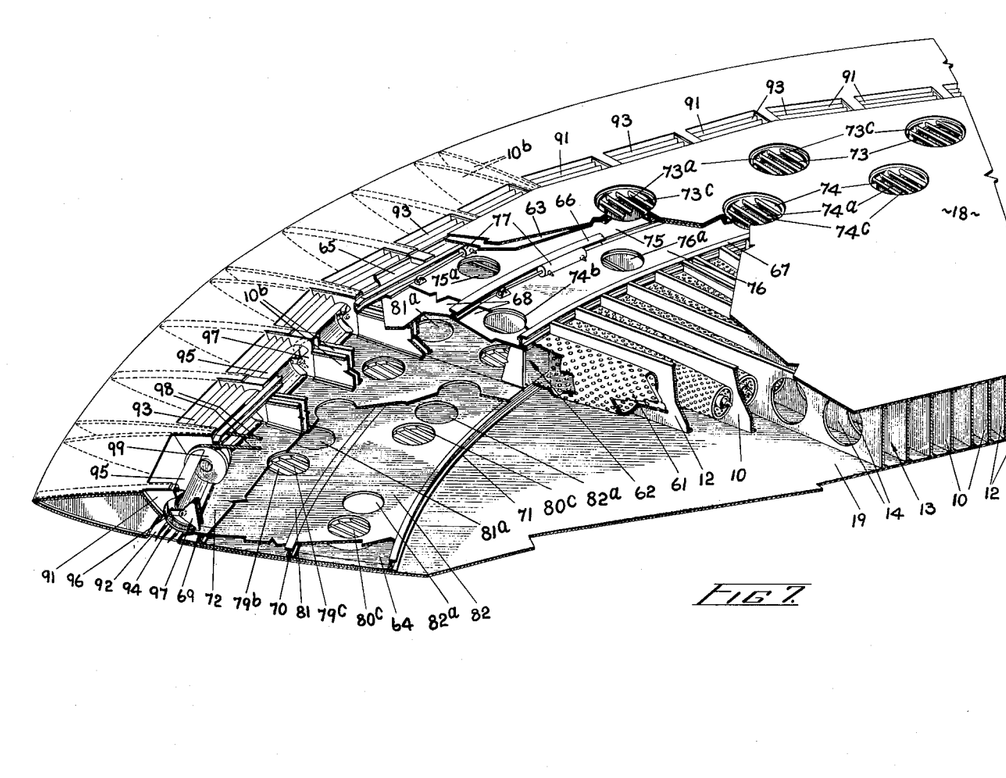
FIG. 7 is a broken away fragmentary perspective view of a typical outboard segment of the aircraft.

The outboard ends of the short ribs 12 are flush with the outlet ends of the flame tubes 61, so that the efflux from pairs of adjacent flame tubes is combined in chambers 62 defined by the outboard segments 10b of adjacent pairs of main ribs 10. To the inner surface of the portion of the upper skin 18 which sheaths the rib segments 10b is secured an upper sub-skin 63, and similarly to the inner surface of the portion of the lower skin 19 which sheaths the rib segments 10b is secured a lower sub-skin 64. Spaced from the sub-skin 63 by channels 65, 66 and 67, and interposed between these channels and the upper edges of the rib segments 10b is an upper inner skin 68. Similarly, spaced from the lower sub-skin 64 by channels 69, 70 and 71, and interposed between these channels and the lower edges of the rib segments 10b is a lower inner skin 72.

In each of the skin 18, the upper sub-skin 63, and the upper skin 68 are provided two series of mutually opposed or registering ports, namely a series of outboard ports 73 and a series of inboard ports 74 in the upper skin 18, a series of outboard ports 73a and a series of inboard ports 74a in the sub-skin 63, and a series of outboard ports 73b and a series of inboard ports 74b in the upper inner skin 68. The registering series of outboard ports 73, 73a and 73b are positioned in a circumferential arrangement, and the registering series of inboard ports 74, 74a and 74b are positioned in a circumferential arrangement inboard of the outboard series and concentric therewith. The registering ports 73, 73a and 73b of the outboard series and the registering ports 74, 74a and 74b of the inboard series are so spaced circumferentially that circumferentially adjacent ports of the outboard series communicate with alternate chambers 62, and circumferentially adjacent ports of the inboard series communicate with intermediate chambers 62. In the ports 73a and 74a of the sub-skin 63 are positioned nozzles 73c and 74c respectively, which nozzles are spanned by louvres which are so oriented as to direct the flow of gases in a rearward direction relative to the direction of flight of the aircraft. The nozzles also are in registration with the ports 73 and 74 respectively of the upper skin 18. Thus each chamber 62 is provided with one upper outlet to atmosphere through the registering ports of one series or of the other, together with the nozzles 73c and 74c.

Interposed between the sub-skin 63 and the inner skin 68 and guided respectively by channels 65 and 66 and by channels 66 and 67 is an outboard series of upper shutters 75 and an inboard series of upper shutters 76. The shutters are annular sectors, and the shutters of each series are assembled in end-to-end relationship to provide two annular series of shutters. The two annular series of shutters slide in unison on circular paths under the control of suitable hydraulic jacks 77 actuated by a selector control 78 in the pilot's compartment. The outboard shutters 75 are provided with holes 75a which, when the shutters are in a "first condition" (i.e., open) register with the ports 73, 73a and 73b to allow the gases from the flame tubes 61 to be ejected through the nozzles 73c. Similarly, the shutters 76 are provided with holes 76a which, when the shutters are in a "first condition" (i.e., open) register with the ports 74, 74a and 74b to allow the gases from the flame tubes 61 to be ejected through the nozzles 74c. When the shutters 75 and 76 are in a "second condition" (i.e., closed) their holes are out of registration with the ports, and the gases thus are prevented from being ejected therethrough.

In each of the skin 19, the lower sub-skin 64, and the lower inner skin 72 are provided two series of mutually opposed or registering ports (see FIG. 7), namely a series of outboard ports 79 and a series of inboard ports 80 in the skin 19, a series of outboard ports 79a and a series of inboard ports 80a in the sub-skin 64, and a series of outboard ports 79b and a series of inboard ports 80b in the lower inner skin 72. The registering series of outboard ports 79, 79a and 79b are positioned in the same circumferential arrangement as the registering series of upper outboard ports 73, 73a and 73b, but there is twice the number of ports 79, 79a and 79b as there is of ports 73, 73a and 73b, one-half of the ports 79, 79a and 79b being directly opposite ports 73, 73a and 73b, and the other half being intermediate the said ports. Likewise the registering series of inboard ports 80, 80a and 80b are positioned in the same circumferential arrangement as the registering series of inboard ports 74, 74a and 74b, but there is twice the number of ports 80, 80a and 80b as there is of ports 74, 74a and 74b, one-half of the ports 80, 80a and 80b being directly opposite ports 74, 74a and 74b, and the other half being intermediate the said ports. In the ports 79a and 80a of the sub-skin 64 are positioned nozzles 79c and 80c respectively, which register with the ports 79 and 80 respectively of the skin 19. Thus each chamber 62 is provided with two possible lower outlets to atmosphere, namely the ports of the outboard series 79, 79a and 79b and together with their nozzles 79c the ports of the inboard series 80, 80a and 80b together with their nozzles 80c. The nozzles which are opposite the upper nozzles 73c and 74c are spanned by louvres which are so oriented as to direct the flow of gases in a rearward direction relative to the direction of flight of the aircraft, whilst the remaining or intermediate nozzles are spanned by louvres which are so oriented as to direct the flow of gases downwardly.

Interposed between the sub-skin 64 and the lower inner skin 72 is an outboard series of lower shutters 81 and an inboard series of lower shutters 82. In construction and in operation these shutters are generally similar to the previously described upper shutters 75 and 76, but they include twice as many holes as are provided in the upper shutters; they operate in unison with the upper shutters under the control of the pilot's selector control. When the shutters 81 and 82 are in a "first condition," one half of the group of holes 81a and 82a are in registration with the ports having nozzles 79c and 80c which direct the flow of gases in a rearward direction (the remaining ports being blocked by solid portions of the shutters), whilst when the shutters are in a "second condition," the other half of the holes are in registration with the ports having nozzles 79c and 80c which direct the flow of gases downwardly (the remaining ports being blocked by solid portions of the shutters).

Figure 3A:
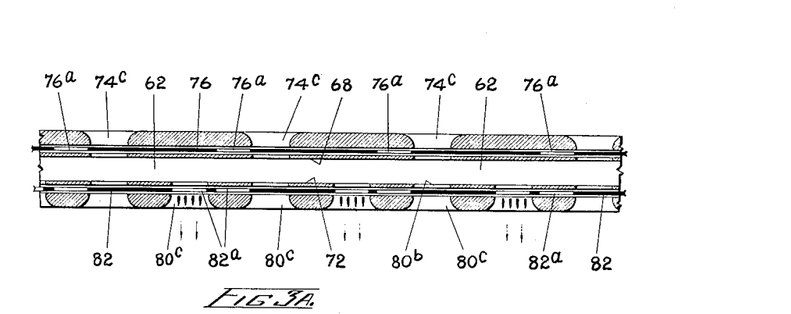
FIG. 3a is a diagrammatic view of a typical group of upper and lower thrust outlets showing the position of the shutters in "vertical take-off" condition.

FIG. 3a is a diagrammatic view of a group of outboard upper and lower thrust outlets showing the position of the shutters in vertical take-off position; only an inboard group of outlets has been illustrated, the outboard outlets being similar. It will be observed that the holes 76a of the upper shutters 76 are out of registration with the ports 74 and their nozzles 74c, so that the gases are prevented from being ejected therethrough. On the other hand, the holes 82a of the lower shutters 82 are in registration with selected ports 80, namely those which have nozzles 80c which direct the flow of gases downwardly; the ports 80 having nozzles 80c which direct the flow of gases in a rearward direction are blocked by solid portions of the shutters.

Figure 3B:
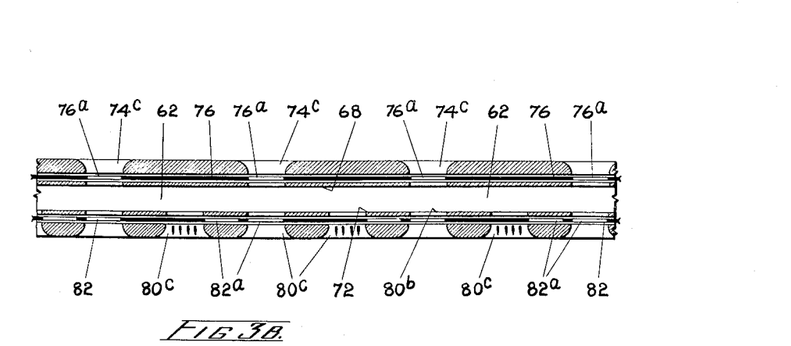
FIG. 3b is a diagrammatic view similar to FIG. 3a and showing the position of the same shutters in "forward flight" condition.

FIG. 3b is similar to FIG. 3a, but it shows the position of the same shutters in "forward flight" position. A comparative study of FIG. 3a and 3b will show that the shutters have been shifted by one step. The upper ports 74 and their nozzles 74c no longer are blocked by the shutters 76 but instead they are in registration with the holes 76a thereof so tha thereof so that there is a rearwardly directed flow of gases. Also, the holes 82a of the lower shutters 82 are in registration with selected ports 80 having nozzles 76c which direct the flow of gases in a rearward direction, whilst the ports 80 having nozzles 80c which direct the flow of gases downwardly are blocked.

Figure 4:
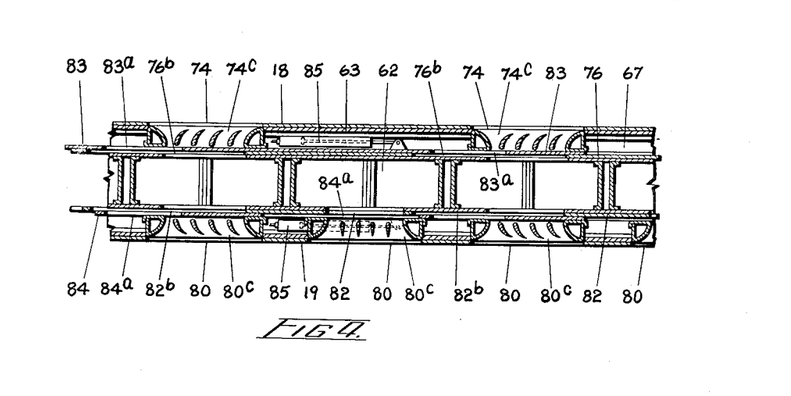
FIG. 4 is a fragmentary cross-sectional view taken along the line 4—4 of FIG. 1, and showing particularly the port "directional control" outlets.

In order to effect directional control of the aircraft there are provided at the port side and at the starboard side of the aircraft pairs of outboard upper nozzles 73c, inboard upper nozzles 74c, outboard lower nozzles 79c and inboard lower nozzles 80c having special shutter arrangements; these nozzles together with the co-operating ports 73, 74, 79 and 80 and the shutters provide the "directional control" outlets. The port outboard directional control outlets are illustrated in FIG. 4, which is a fragmentary cross-sectional view taken along the line 4—4 of FIG. 1; the non-illustrated port outboard directional control outlets are similar to the inboard ones. The starboard directional control outlets are similar to the port directional control outlets, and therefore they are not illustrated.

The portions of the shutters 75, 76, 81 and 82 which are opposite the directional control outlets are provided with elongated slots as indicated at 76b and 82b in FIG. 4 (the slots in the shutters 75 and 81 not being illustrated), so as to permit a continuous flow of gases through the outlets controlled by these shutter portions. Superimposed on the slotted portions of the respective shutters 76 and 82 are directional control shutters 83 and 84 having holes 83a and 84a which are adapted to register with the ports and nozzles of the corresponding pairs of directional control outlets.

The directional control shutters at opposite sides of the aircraft are differentially operated by a hydraulic system, including jacks 85 (see FIG. 4) and a control 85a situated in the pilot's compartment. With the control 85a at the neutral position, the shutters 83 and 84 (and the corresponding shutters on the starboard side) will block the directional control outlets and thus the aircraft will travel in a straight path. By operating the control 85a the pilot will cause the shutters 83 and 84 to slide so that the holes 83a and 84a will come into registration with the corresponding rearwardly directed nozzles, thus increasing the thrust on the port side of the aircraft and causing the aircraft to turn about its directional axis. The turning moment will vary with the extent by which the holes 83a and 84a are in registration with the corresponding ports and nozzles. If he wishes to turn the aircraft in the opposite direction, the pilot will actuate in a similar manner the direction control shutters on the starboard side.

Figure 4A:
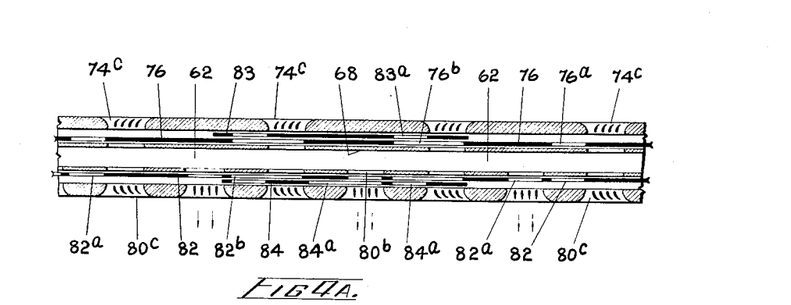
FIG. 4a is a diagrammatic view of the port directional control outlets showing their shutters in closed position, the thrust outlet shutters being shown in vertical take-off condition.

In FIG. 4a, which is a diagrammatic view of the port directional control outlets, the shutters 76 and 82 are in vertical take-off condition. The directional control shutters 83 and 84 are closed so that the holes 83a and 84a are out of registration with the ports and nozzles of the corresponding pairs of directional control outlets and thus there will be no turning moment on the aircraft. It will be noted however that although the directional control outlets are closed air nevertheless is being ejected through the downwardly directed outlets.

Figure 4B:
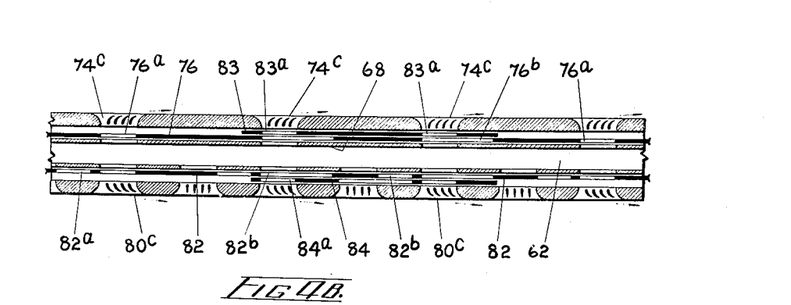
FIG. 4b is a diagrammatic view similar to FIG. 4a showing the directional control shutters in open position, the thrust outlet shutters being shown in forward flight condition.

FIG. 4b is similar to FIG. 4a, but the shutters 76 and 82 are shown in forward flight condition and the directional control shutters 83 and 84 are fully open, that is, their holes 83a and 84a are in registration with the ports and nozzles of the corresponding pairs of directional control outlets. Thus air is ejected through these outlets, and since the corresponding outlets at the starboard side of the aircraft would be fully closed, the thrust on the port side of the aircraft will be greater than on the starboard side and the aircraft will turn about its directional axis towards starboard.

Adjacent the periphery of the aircraft in its upper and lower skins are opposed series of generally rectangular nozzles provided to trim and to stabilize the aircraft. Referring to FIGS. 1, 2, and 7, the space between the inner skins 68 and 72 at their outboard edges opens into a bifurcated duct which terminates in upper nozzles 91 and in lower nozzles 92. In the nozzles are located cascades of vanes 93 and 94 which are so oriented as to direct the ejected gases vertically up or vertically down, respectively. Crescent shaped shutters 95 are mounted within the nozzles and they are adapted to vary the flow characteristics of the nozzles by opening and closing them so as to selectively permit and prevent the ejection of gases therefrom.

Figure 5:
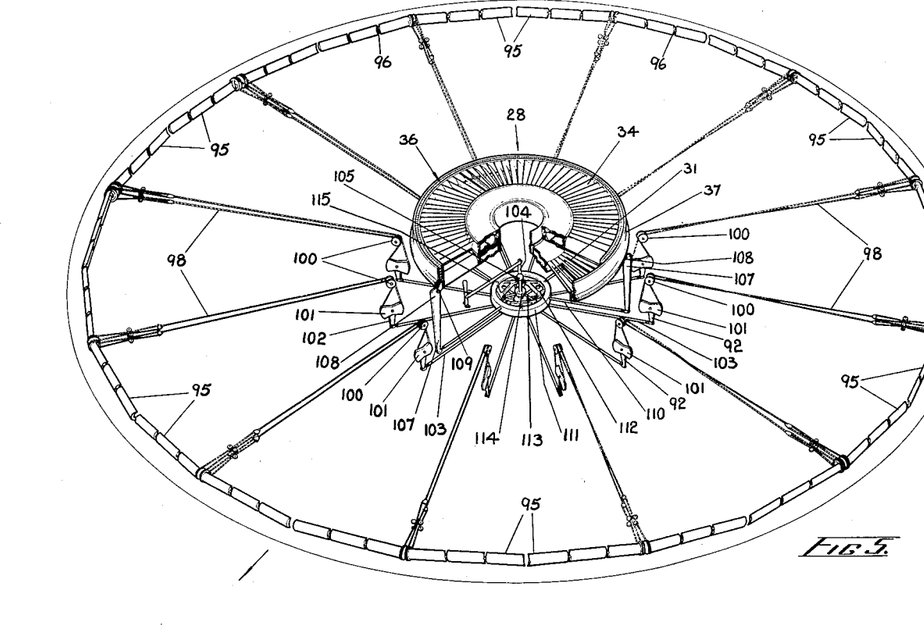
FIG. 5 is a perspective view of the aircraft stabilizing and trim control system, which for greater clarity is shown removed from the aircraft and in a fictitious unsupported condition.
Figure 6:
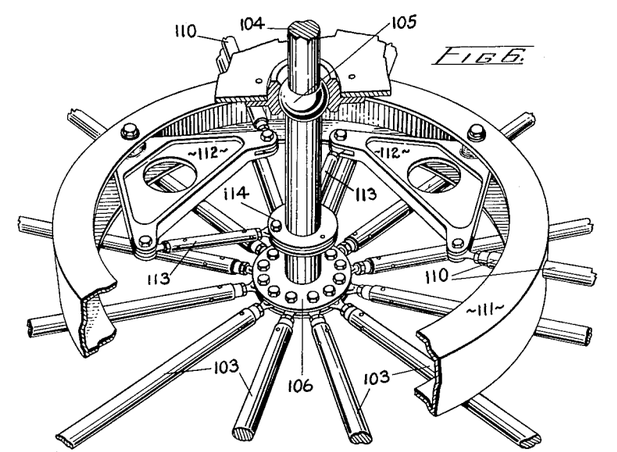
FIG. 6 is a broken away fragmentary perspective view to an enlarged scale of the central portion of the stabilizing and trim control system.

The shutters 95 are mounted on rods 96 which are in turn supported by the ends of the rib segments 10b by means of arms 97. The shutters are of such a length that they span the spaces between the ribs 10b, and the rods 96 connect the shutters in groups of three. Each shutter group is paired with one adjoining group for actuation by control cables 98. The control cables, which in part are located in the spaces between the dual ribs 10a, are suitably coupled to the shutters through pulleys 99; they also pass over pulleys 100 and around quadrants 101. The quadrants 101 which are equiangularly spaced around the central portion of the aircraft are caused to rotate by cranks 102 to which are connected one of the ends of reciprocatable control rods 103. A control stick 104 is mounted to a fixed portion of the aircraft by means of a ball and socket joint 105, and its lower end is provided with a universal mounting 106 to which are attached the other ends of the control rods 103. It will be apparent that movement of the control stick in any direction will cause a corresponding movement of the control rods 103 thus actuating the cables 98 and selectively varying the position of the shutters 95 relative to the nozzles 91 and 92 to open the nozzles to varying extents or to close them.

In order to provide automatic stability for the aircraft, the gyroscopic forces of the impeller 34 of the compressor 28 are utilized and fed back into the control system. The stator ring 37 is stabilized at three equi-angular points by vertical arms 107 pivotally mounted on the aircraft structure by pins 108. Each arm at its upper end is pivotally attached to the ring 37 by a pin 109, and it is pivotally attached at its lower end to one end of a rod 110. The rods 110 pass through oversize holes in the rim of a ring 111 and are each secured to a free end of one of three bell cranks 112 mounted at their fulcrums to the flanges of the ring 111. The other ends of the bell cranks are connected through links 113 to a ring 114 of the control stick 104. By this arrangement, the impeller 34 (which provides a gyroscope) and the control means of the trim and stabilizing nozzles are linked so that the forces which tend to change the attitude of the aircraft will be counteracted by the controlled flow of the efflux from the outlet.

In operation, with the aircraft on the ground, in order to prepare for take-off the pilot sets the selector control to the take-off position, thereby setting the upper shutters 75 and 76 at the "second condition," thus blocking the flow of gases through the upper nozzles 73c and 74c, and also setting the lower shutters 81 and 82 at the "second condition" so that the gases flow only through the lower nozzles 79c and 80c having louvres which direct the flow of gases downwardly. The three axial flow gas turbine engines 26 are then started, thereby driving the turbine 36 which in turn drives the impeller 34. Air drawn by the impeller is compressed and flows inwardly in the duct 40, opening the doors 60 and building up pressure in the plenum chambers 51 and 57 thereby closing the vanes 52 and 58. When the impeller 34 reaches its operating speed, sufficient mass flow of air will be induced into the duct 40 and forced through the radial ducts 13 and out of the lower downwardly directed nozzles 79c and 80c to raise the aircraft vertically from the ground. The high mass flow of downwardly directed gases, coming as it does initially as individual jets from closely spaced discreet nozzles, coheres to form a downwardly directed cylindrical sheet which supports the aircraft by means of the static thrust together with the "ground cushion effect" present in a cylindrical stream.

When the desired altitude has been reached the pilot can transfer to forward flight by moving the selector control slowly to the "forward flight" position. In so doing the upper shutters 75 and 76 and the lower shutters 81 and 82 gradually move to the "first condition"; thus, the upper nozzles 73c and 74c gradually open whilst the lower nozzles 79c and 80c which are downwardly directed gradually close and those which are rearwardly directed gradually open. As a consequence, all the gases are ejected in a rearward direction, causing the aircraft to move forwardly.

In the procedure just described, the aircraft has been caused to hover and to assume forward flight by means of a mass flow of cold gases. If desired, and in order to increase the thrust output, the flame tubes 61 may be "lit" and their total thrust will be added to the thrust from the gas turbine engines.

The flow conditions in the ducts 13 are such that the flame tubes will operate efficiently solely on air inducted by the impeller 34. This makes possible the efficient operation of the aircraft as a ram-jet at low or even at zero aircraft velocities. The pilot may, if he wishes, in the case of a heavily loaded aircraft or when a rapid take-off and climb are desired, 'light" his flame tubes as soon as the impeller 34 reaches the required speed.

When the velocity in forward flight has become sufficiently great, the forwardly facing vanes 52 and 58 in the inlets 50 and 56 respectively will open, and the ram pressure in the plenum chambers 51 and 57 and in the radial ducts 13 will be high enough to cause the desired flow conditions through the flame tubes 61. When this velocity is attained, the gas turbine engines 26 can be throttled back to an extent sufficient only to maintain the required gyroscopic forces in the impeller to provide automatic stability so that the aircraft will operate as a ram-jet engine. When the engines 26 are throttled back the pressure in the duct 40 is lowered, and, because of the higher air pressure in the plenum chambers 51 and 57, the doors 60 will close automatically.

Automatic longitudinal or lateral stability control of the aircraft is effected by manipulation of the shutters 95 to direct a vertical stream of gases from a selected portion of the periphery of the aircraft to cause a moment which will correct for the instability. If, for example, there is a resultant downwardly directed force at the nose of the aircraft which causes the nose to drop, the initial rotation of the aircraft about its lateral axis will impose a downward force on the forward portion of the rotating impeller 34. Since the impeller in the aircraft described is rotating in a counterclockwise direction, it will precess downwardly to the left because of the gyroscopic forces. This precession force will be transmitted through the ring 37 to the arms 107 and will be such as to move the control stick 104 and the attached control rods 103 in a forward direction. This forward movement of the control rods will cause the fore and aft quadrants 101 to rotate in a direction which will open the rear shutters 95 to direct a stream of gases vertically upwards through the rear upper nozzles 91 and which will open the forward shutters 95 to direct a stream of gases vertically downwards through the front lower nozzles 92, thus producing a moment which will counteract the moment caused by the disturbing force.

Flight control by the pilot is effected by manipulation of the control stick 104. This may be done directly, if space permits, by extending the upper portion of the stick beyond the ball and socket joint 105 in order to provide a hand grip for the pilot. If direct operation is not possible because of space limitations or because of cockpit layout, the pilot may be provided with a remote control stick connected by a servo mechanism or by mechanical means 115 to the control stick 104.

It will be realized that, although the gyroscopic forces of the impeller 34 are used to effect automatic stability, they do not predominate the control forces so that there is no need to displace the operation of the shutters by 90° relative to the direction of the required force.

The aircraft illustrated in FIGS. 8–11 essentially is similar to the aircraft previously described. It differs therefrom in that four radially disposed axial flow gas turbine engines 200 are provided (instead of three), in the disposition of these engines, in the construction and arrangement of its turbine 201 and of its compressor 202, and in structural details of its stabilizing and trim control system.

Figure 8:
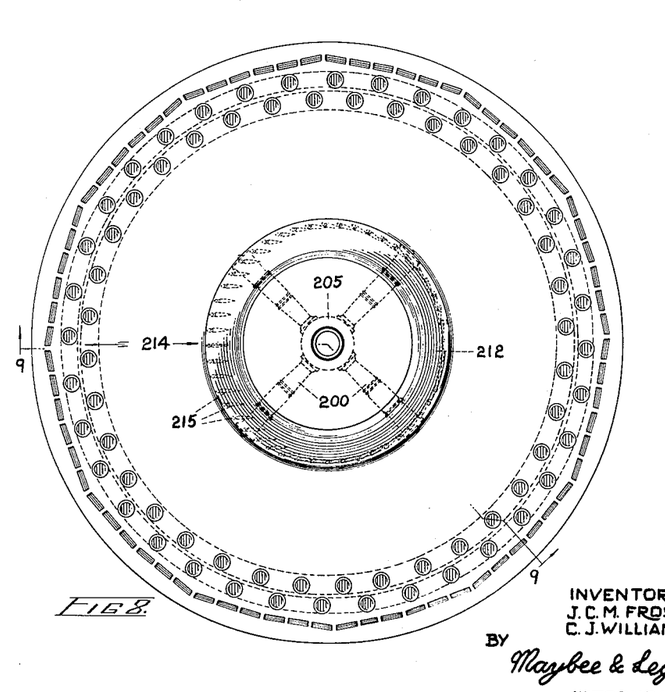
FIG. 8 is a plan view of a second embodiment of an aircraft constructed in accordance with the invention.
Figures 9, 11:
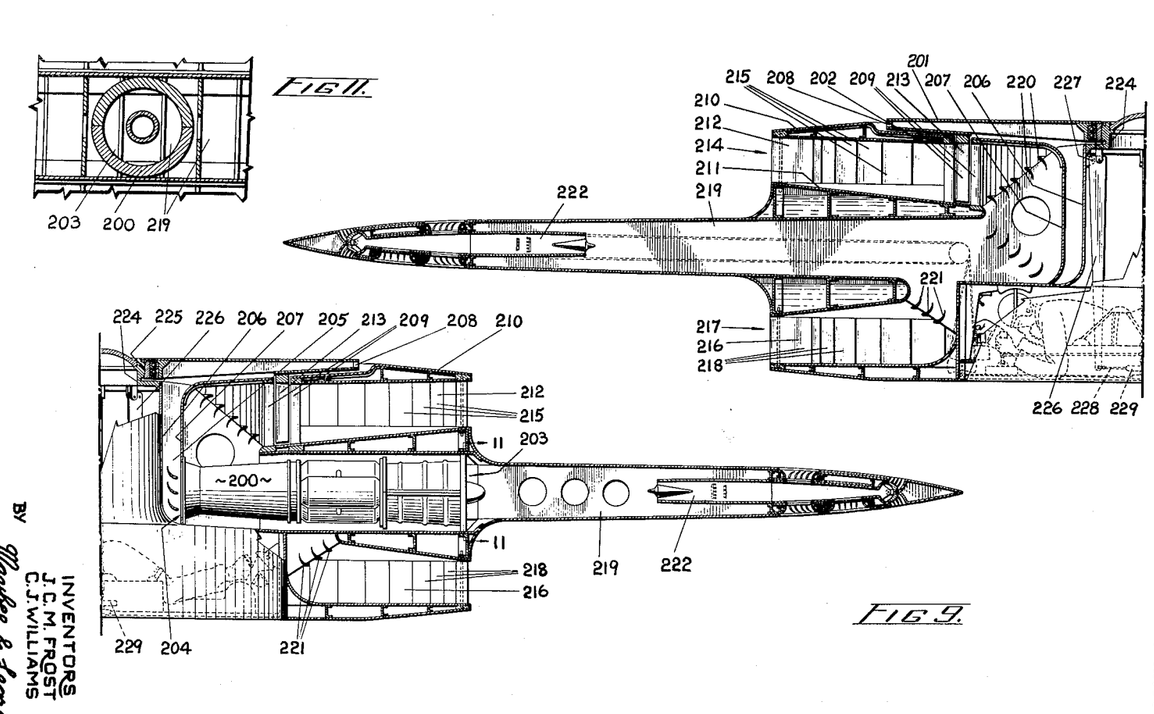
FIG. 9 is a cross-sectional view of the aircraft of FIG. 8, taken along the line 9—9 of FIG. 8.
FIG. 11 is a fragmentary cross-sectional view taken along the line 11—11 of FIG. 9.

Four gas turbine engines 200 are disposed with their inlets 203 facing outboardly and their outlets 204 facing inboardly and registering with an annular cylindrical passage 205 defined by fixed walls 206 and 207 which form a part of the aircraft structure. The products of combustion from the engines 200 are ejected into the passage 205 and they flow therein upwardly and then outboardly to cause rotation of the impeller 208 of the reaction turbine 201. Two rings of compressor stator blades 209 bridge walls 210 and 211 of a plenum chamber 212; extending downwardly from the impeller of the turbine 201 and interposed between the rings of stator blades 209 are rotor blades 213 of the radial flow compressor 202.

The plenum chamber 212 has a circumferential inlet or intake 214 provided with freely movable vanes 215 similar in construction and in operation to the vanes 52 of the first described embodiment. In the lower portion of the aircraft is another plenum chamber 216 having a circumferential inlet or intake 217 and freely movable vanes 218. In FIGS. 8 and 9 the vanes 215 and 218 are shown in the positions which they assume when the aircraft is in forward flight; when the aircraft is effecting vertical takeoff, all of the vanes 215 and 218 are open.

The plenum chambers 212 and 216 in effect are branches of an air displacement passage, which branches extend inboardly and inwardly from the inlets 214 and 217 and meet to provide a common passage which includes ducts 219 defined by the radially disposed ribs of the aircraft.

In operation, air enters the circumferential inlets 214 and 217, flows inboardly through the plenum chambers 212 and 216 and is then deflected inwardly by circumferential cascades of vanes 220 and 221 in the common passage and finally flows radially outboardly through the ducts 219. A fraction of the air enters the inlets 203 of the four gas turbine engines 200 whilst the remainder passes through the flame tubes 222 in the same manner as in the embodiment of the invention previously described.

Figure 10:
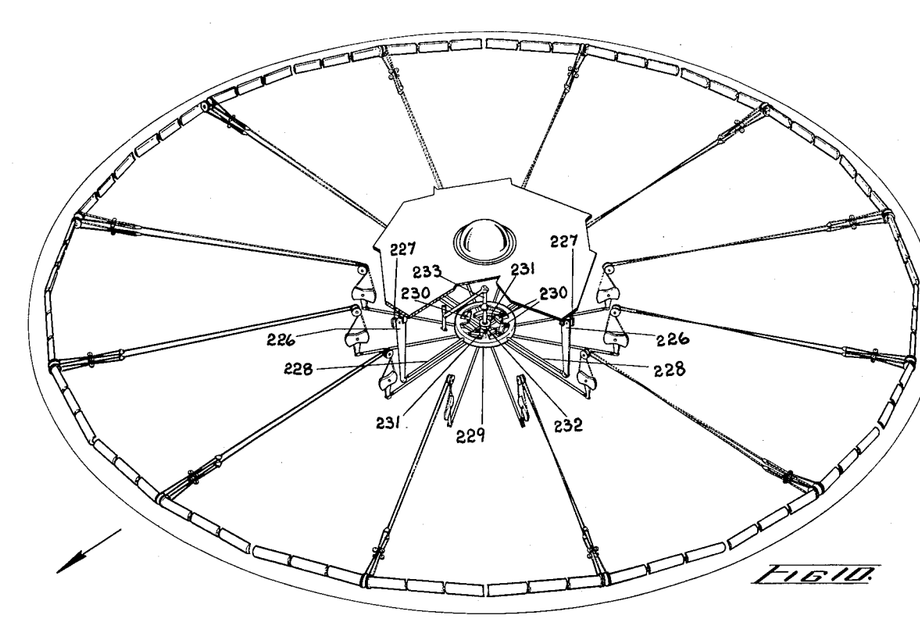
FIG. 10 is a perspective view of the stabilizing and trim control system of the aircraft of FIGS. 8 and 9, which for greater clarity is shown removed from the aircraft and in a fictitious unsupported condition.

The control system is similar to that of the first embodiment of the invention and therefore it will not be described in detail. It differs therefrom in the construction and arrangement of the means whereby the gyroscopic forces of the impeller 208 of the reaction turbine 201 are utilized and fed back into the control system.

At the upper end of the cylindrical wall 206 is a flanged ring 224 on the periphery of which is a segmental spherical bearing 225. The impeller 208 of the turbine 201 (which impeller also provides the rotor of the compressor 202) has a complementary bearing in engagement with the segmental spherical bearing 225; thus the rotor is mounted on the ring 224 for limited universal movement. The rotor is stabilized at four equiangular points by vertical arms 226 pivotally mounted to the cylindrical wall 206 by pins 227. Each of the four arms at its upper end is pivotally attached to a dependent arm of the rotor bearing, which arm extends through a slot in the ring 224, and it is pivotally attached at its lower end to one end of a rod 228. The four rods 228 pass through oversize holes in the rim of a ring 229 and they are each secured to a free end of one of four bell cranks 230 mounted at their fulcrums to the flange of the ring 229. The other ends of the bell cranks are connected through links 231 to a ring 232 of the control stick 233. Apart from the fact that the gyroscopic device just described has a four point stabilizing support whilst the gyroscopic device of the first embodiment of the invention has a three point stabilizing support, the construction and the operation of the two devices are the same.

The aircraft illustrated in FIGS. 8–11 is controlled and is operated in substantially the same manner as the aircraft of FIGS. 1–7. Since all the air enters the aircraft through the inlets 214 and 217 and there is no special inlet for the compressor 202, this aircraft does not have any doors equivalent to the doors 60 of the aircraft first described. The main advantage of the aircraft of FIGS. 8–11 over the aircraft of FIGS. 1–7 is due to the fact that the compressor is located in the air passage proper, and not in an inlet in the upper surface of the aircraft. With the aircraft of FIGS. 1–7, in forward flight one side of the impeller would be meeting the air at a very high speed and be almost stalled, whereas on the other side the relative velocity would be nearly zero. This condition produces not only a loss in thrust but also produces a rolling moment due to the imbalance of thrust. Furthermore, with the inlet disposed as it is in the aircraft of FIGS. 1–7 and with the aircraft in forward flight, the air is required to bend through 90° to enter the inlet and high losses are suffered especially at the higher forward speeds.

Figure 12:
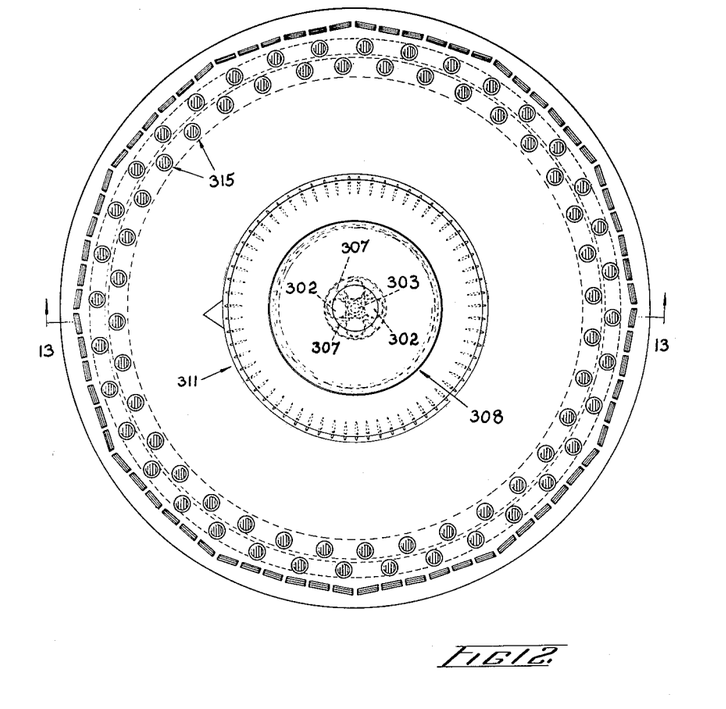
FIG. 12 is a plan view of a third embodiment of an aircraft constructed in accordance with the invention.
Figure 13:
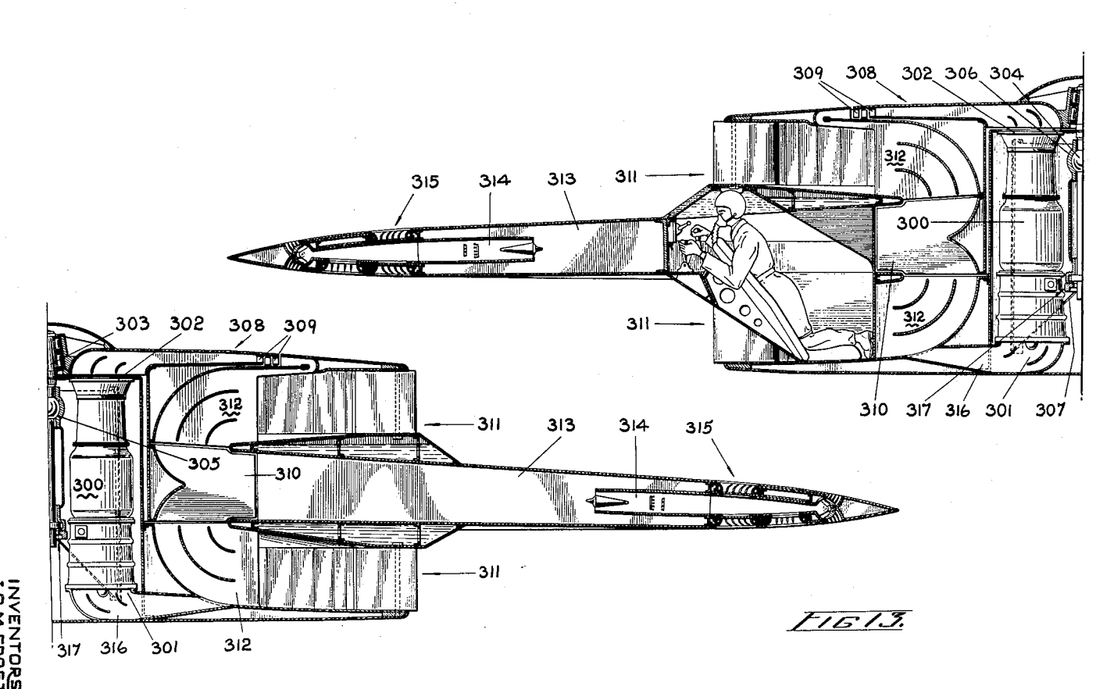
FIG. 13 is a cross-sectional view of the aircraft of FIG. 12, taken along the line 13—13 of FIG. 12.

In the aircraft of FIGS. 1–7 the three axial flow engines 26 have inboardly facing inlets and outboardly facing outlets, whilst in the aircraft of FIGS. 8–11 the four axial flow engines have outboardly facing inlets and inboardly facing outlets. This suggests the possibility of disposing the axial flow engines in other manners, and according to a third embodiment of the invention which is illustrated in FIGS. 12 and 13 it is proposed to position four axial flow engines 300 around the vertical central axis of the aircraft with their inlets 301 facing downwardly and their outlets 302 facing upwardly. At the centre of the aircraft is a vertical shaft 303 on a portion of which is a spherical bearing 304. The shaft through its bearing is supported by the spherical bearing surfaces 305 of a tubular housing 306, which housing rigidly is secured to the aircraft structure by four radially disposed plates 307. Rotatably mounted at the upper end of the shaft is a rotor generally indicated at 308 and which provides both the impeller of a radial flow turbine 309 and the impeller of a centrifugal compressor 310.

Air enters upper and lower circumferential inlets 311, flows inboardly through plenum chambers 312, is deflected inwardly, is compressed by the compressor, and is ejected outboardly through ram jet engines provided by ducts 313 and flame tubes 314, and finally through thrust outlets generally indicated at 315 and which are similar to the outlets of the two embodiments of the invention previously described. A fraction of the air enters the downwardly facing inlets 301 of the axial flow engines 300 through ducts 316 which are connected to the lower plenum chamber 312. The products of combustion of the four axial flow engines 300 are ejected from the engine outlets 302 and they then power the radial flow turbine 309.

As in the previously described embodiments of the invention the gyroscopic forces of the rotor 308 are utilized and fed back into the control system so as to operate the stabilizing and trim nozzles of the aircraft. The spherical bearing 304 enables the shaft 303 to swing (within limits) relative to the tubular housing 306. Any change in the attitude of the aircraft will cause the rotor 308 to tilt slightly relative to the supporting structure of the aircraft, thus swinging the shaft 303. This swinging movement is sensed by a suitable device located adjacent the lower end of the shaft 303 and generally indicated at 317 and is fed back into the control system of the stabilizing and trim nozzles; the control system essentially is similar to that of the two aircrafts previously described.

An aircraft constructed according to the third embodiment of the invention has a number of advantages, the majority of which are mechanical. Because of the type of compressor used, it has now become possible to reduce the tip speed of its blades by over 25% with a corresponding reduction in rotor speed. Furthermore, it has become possible to materially reduce the length of hot ducting by disposing the engines vertically in the centre as well as improving the basic radial structure since it is not now disturbed by the engines. Also, with the centrifugal impeller placed as it is, the impeller draws air equally from both the upper and the lower intake ducts and so precludes any tendency for the formation of any moments about the pitch axis.

It is to be understood that the forms of the invention herewith shown and described are to be taken only as examples of the same, and that various changes in the construction and arrangement of the parts may be resorted to without departing from the spirit of the invention or the scope of the subjoined claims. It will be noted that by the constructions described not only is a saving of fuel effected through the use of the highly efficient ram-jet engines, but a major saving also has been made in engine and in structural weight due to the inherent light weight of ram-jet engines.

What we claim as our invention is:

1. An aircraft comprising a generally lentiform structure sheathed by opposed aerofoil surfaces which provide lift developing surfaces, an air displacement passage within the structure and having an intake and having an annularly arranged outlet adjacent the perimeter of the structure, the air displacement passage including a plurality of generally radially disposed ducts, flame tubes positioned in the ducts adjacent the outlet to eject their products of combustion therethrough, the ducts and the flame tubes together providing ram jet engines, means in the passage to supply air under compression to the ram jet engines, and means at the outlet to control selectively the flow of the efflux from the outlet to provide a controlled propulsive thrust.

2. An aircraft comprising a generally lentiform structure sheathed by opposed aerofoil surfaces which provide lift developing surfaces, an air displacement passage within the structure and having an intake and having an annularly arranged outlet adjacent the perimeter of the structure, the air displacement passage including a plurality of generally radially disposed ducts, flame tubes positioned in the ducts adjacent the outlet to eject their products of combustion therethrough, the ducts and the flame tubes together providing ram jet engines, an air compressor in the passage to supply air under compression to the ram jet engines, engine means to operate the compressor, and means at the outlet to control selectively the flow of the efflux from the outlet to provide a controlled propulsive thrust.

3. An aircraft comprising a generally lentiform structure sheathed by opposed aerofoil surfaces which provide lift developing surfaces, an air displacement passage within the structure and having an intake and having an annularly arranged outlet adjacent the perimeter of the structure, the air displacement passage including a plurality of generally radially disposed ducts, flame tubes positioned in the ducts adjacent the outlet to eject their products of combustion therethrough, the ducts and the flame tubes together providing ram jet engines, an air compressor in the passage to supply air under compression to the ram jet engines, a gas turbine coupled to the compressor to operate it, a gas generator to operate the turbine, and means at the outlet to ocntrol selectively the flow of the efflux from the outlet to provide a controlled propulsive thrust.

4. An aircraft comprising a generally lentiform structure including a core and a plurality of generally radially disposed ribs extending from the core in outboard directions, opposed aerofoil surfaces sheathing the core and the ribs and providing lift developing surfaces, the ribs defining radially arranged ducts, an air displacement passage within the structure and having an intake and having an annularly arranged outlet adjacent the perimeter of the structure, the passage including the said ducts, flame tubes positioned in the ducts adjacent the outlet to eject their products of combusion therethrough, the ducts and the flame tubes together providing ram jet engines, means to supply air under compression to the ram jet engines, and means at the outlet to control selectively the flow of the efflux from the outlet to provide a controlled propulsive thrust.

5. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure and having an intake in the core and an annularly arranged outlet adjacent the perimeter of the disc, the air displacement passage including a plurality of generally radially disposed ducts, flame tubes positioned in the ducts adjacent the outlet to eject their products of combustion therethrough, the ducts and the flame tubes together providing ram jet engines, an air compressor in the core including a rotor having an axis of rotation which substantially coincides with the central axis of the core, the compressor supplying air under compression to the ram jet engines, engine means to operate the compressor, and means at the outlet to control selectively the flow of the efflux from the outlet to provide a controlled propulsive thrust.

6. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure and having an intake in the perimeter of the core and an annular intake at the upper axial end of the core, the passage also having an annularly arranged outlet adjacent the perimeter of the disc, the air displacement passage including a plurality of generally radially disposed ducts, flame tubes positioned in the ducts adjacent the outlet to eject their products of combustion therethrough, the ducts and the flame tubes together providing ram jet engines, an air compressor in the core including a rotor in the annular intake and having an axis of rotation which substantially coincides with the central axis of the core, the compressor supplying air under compression to the ram jet engines, engine means to operate the compressor, and means at the outlet to control selectively the flow of the efflux from the outlet to provide a controlled propulsive thrust.

7. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure and having an intake in the perimeter of the core and an annular intake at the upper axial end of the core, the passage also having an annnular arranged outlet adjacent the perimeter of the disc, the air displacement passage including a plurality of generally radially disposed ducts, flame tubes positioned in the ducts adjacent the outlet to eject their products of combustion therethrough, the ducts and the flame tubes together providing ram jet engines, an air compressor in the core including a rotor in the annular intake and having an axis of rotation which substantially coincides with the central axis of the core, the compressor supplying air under compression to the ram jet engines, a gas turbine coupled to the compressor rotor to operate it, a plurality of gas turbine engines positioned in the passage to receive air from the intake, duct means to convey expanding products of combustion from the gas turbine engines to the gas turbine to operate the latter, and means at the outlet to control selectively the flow of the efflux from the outlet to provide a controlled propulsive thrust.

8. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure and including a first plenum chamber having a perimetrical intake in the perimeter of the core and a second plenum chamber having an annular intake at the upper axial end of the core, the passage also having an annularly arranged outlet adjacent the perimeter of the disc, the passage including a plurality of radially disposed ducts between the plenum chambers and the outlet, flame tubes positioned in the ducts adjacent the outlet to eject their products of combustion therethrough, the ducts and the flame tubes together providing ram jet engines, an air compressor in the core including a rotor in the annular intake and having an axis of rotation which substantially coincides with the central axis of the core, the compressor supplying air under compression to the ram jet engines, engine means to operate the compressor, an alternative supply of air under compression for the ram jet engines being provided through the perimetrical intake when the aircraft is in forward flight, doors separating the two plenum chambers, the doors being freely movable and automatically closing when the local pressure in the first plenum chamber exceeds the local pressure in the second plenum chamber and thus preventing the escape of air from the perimetrical intake through the annular intake, the doors automatically opening under the reverse conditions, a series of circumferentially arranged movable vanes in the perimetrical intake, the vanes automatically opening whenever the force of the air which strikes them exceeds the local pressure within the first plenum chamber and automatically closing under the reverse condition, and means at the outlet to control selectively the flow of the efflux from the outlet to provide a controlled propulsive thrust.

9. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure and including a plenum chamber having a perimetrical intake in the perimeter of the core and an annularly arranged outlet adjacent the perimeter of the disc, the air displacement passage including a plurality of generally radially disposed ducts between the plenum chamber and the outlet, flame tubes positioned in the ducts adjacent the outlet to eject their products of combustion therethrough, the ducts and the flame tubes together providing ram jet engines, a turbine in the core including an impeller having an axis of rotation which substantially coincides with the central axis of the core, a radial flow compressor in the plenum chamber coaxial with the turbine and including a rotor portion fast to the impeller of the turbine, a gas turbine engine in the passage, a duct to convey the products of combustion of the gas turbine engine to the impeller of the turbine to operate the latter, and means at the outlet to control selectively the flow of the efflux from the outlet to provide a controlled propulsive thrust.

10. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure, the passage including branches which extend inboardly and inwardly into the core from intakes in the perimeter of the core at each side of the disc, the said branches meeting and blending to provide a common passage which includes a plurality of generally radially disposed ducts which extend outboardly within the disc to an annularly arranged outlet adjacent the perimeter of the disc, flame tubes positioned in the ducts adjacent the outlet to eject their products of combustion therethrough, the ducts and the flame tubes together providing ram jet engines, a turbine in the core including an impeller having an axis of rotation which substantially coincides with the central axis of the core, a radial flow air compressor in the upper branch of the passage, the compressor including a rotor portion coaxial with and fast to the impeller of the turbine, air under compression being supplied to the ram jet engines by the compressor when the aircraft is in vertical flight and by the ramming effect in the intakes when the aircraft is in forward flight, a plurality of gas turbine engines in the passage, a duct to convey the products of combustion of the gas turbine engines to the impeller of the turbine to operate the latter, and means at the outlet to control selectively the flow of the efflux from the outlet to provide a controlled propulsive thrust.

11. An aircraft comprising a general lentiform structure sheathed by opposed aerofoil surfaces which provide lift developing surfaces, an air displacement passage within the structure and having an intake and having an annularly arranged outlet adjacent the perimeter of the structure, the air displacement passage including a plurality of generally radially disposed ducts, flame tubes positioned in the ducts adjacent the outlet to eject their products of combustion therethrough, the ducts and the flame tubes together providing ram jet engines, a rotary air compressor in the passage to supply air under compression to the ram jet engines, engine means to operate the compressor, the compressor including a rotor mounted on the structure for limited universal movement relative thereto and which provides a gyroscope sensitive to forces tending to change the attitude of the aircraft, means at the outlet to control selectively the flow of the efflux from the outlet to provide a controlled propulsive thrust, and means linking the control means and the gyroscope so that the forces which tend to change the attitude of the aircraft will be counteracted by the controlled flow of the efflux from the outlet.

12. An aircraft comprising a generally lentiform structure sheathed by opposed aerofoil surfaces which provide lift developing surfaces, an air displacement passage within the structure and having an intake and having an annularly arranged outlet adjacent the perimeter of the structure, the air displacement passage including a plurality of generally radially disposed ducts, flame tubes positioned in the ducts adjacent the outlet to eject their products of combustion therethrough, the ducts and the flame tubes together providing ram jet engines, a rotary air compressor in the passage to supply air under compression to the ram jet engines, engine means to operate the compressor, the compressor including a rotor mounted on the structure for limited universal movement relative thereto and which provides a gyroscope sensitive to forces tending to change the attitude of the aircraft, means at the outlet to control selectively the flow of the efflux from the outlet to provide a controlled propulsive thrust, said means including trim and stabilizing nozzles, means to vary the flow characteristics of the nozzles, means to operate the flow characteristic varying means selectively, and means linking the flow characteristic varying means and the gyroscope so that the forces which tend to change the attitude of the aircraft will be counteracted by the thrust from the nozzles.

13. An aircraft comprising a generally lentiform structure sheathed by opposed aerofoil surfaces which provide lift developing surfaces, an air displacement passage within the structure and having an intake and having an annularly arranged outlet adjacent the perimeter of the structure, the air displacement passage including a plurality of generally radially disposed ducts, flame tubes positioned in the ducts adjacent the outlet to eject their products of combustion therethrough, the ducts and the flame tubes together providing ram jet engines, a rotary air compresor in the passage to supply air under compression to the ram jet engines, engine means to operate the compressor including a rotor mounted on the structure for limited universal movement relative thereto and which provides a gyroscope sensitive to forecs tending to change the attitude of the aircraft, means at the outlet to control selectively the flow of the efflux from the outlet to provide a controlled propulsive thrust, the said means including upwardly directed and downwardly directed trim and stabilizing nozzles through which the products of combustion are ejected in localized streams having opposite components of thrust, shutters for the nozzles to vary the flow characteristics thereof, means to operate the shutters selectively, and means linking the control means and the gyroscope so that the forces which tend to change the attitude of the aircraft will be counteracted by the thrust from the nozzles.

14. An aircraft comprising a core of generally circular cross-section, an annular hollow disc extending outboardly from the perimeter of the core, the core and the disc together providing a generally lentiform structure having opposed aerofoil surfaces which provide lift developing surfaces, an air displacement passage within the structure and having an intake in the core and an annularly arranged outlet adjacent the perimeter of the disc, the air displacement passage including a plurality of generally radially disposed ducts, flame tubes positioned in the ducts adjacent the outlet to eject their products of combustion therethrough, the ducts and the flame tubes together providing ram jet engines, an air compresor in the core including a rotor having an axis of rotation which substantially coincides with the central axis of the core, the compressor supplying air under compression to the ram jet engines, engine means to operate the compressor, the rotor being mounted in the core for limited universal movement relative thereto, the rotor thus providing a gyroscope sensitive to forces tending to change the attitude of the aircraft, means at the outlet to control selectively the flow of the efflux from the outlet to provide a controlled propulsive thrust, and means linking the control means and the gyroscope so that the forces which tend to change the attitude of the aircraft will be counteracted by the controlled flow of the efflux from the outlet.

No references cited.